United States Patent
Kang et al.

(10) Patent No.: US 9,613,623 B2
(45) Date of Patent: Apr. 4, 2017

(54) USER INTERFACE METHOD AND DEVICE COMPRISING REPEATED OUTPUT OF AN AUDIBLE SIGNAL AND A VISUAL DISPLAY AND VIBRATION FOR USER NOTIFICATION

(75) Inventors: Donghyun Kang, Seoul (KR); Sangjo Park, Seoul (KR); Dongyoung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 467 days.

(21) Appl. No.: 13/466,865

(22) Filed: May 8, 2012

(65) Prior Publication Data

US 2013/0080178 A1 Mar. 28, 2013

(30) Foreign Application Priority Data

Sep. 26, 2011 (KR) .................. 10-2011-0096721

(51) Int. Cl.
| | |
|---|---|
| G10L 21/00 | (2013.01) |
| H04B 1/38 | (2015.01) |
| G10L 15/22 | (2006.01) |
| G06F 3/16 | (2006.01) |
| G10L 15/26 | (2006.01) |
| H04M 1/725 | (2006.01) |

(52) U.S. Cl.
CPC .............. *G10L 15/22* (2013.01); *G06F 3/167* (2013.01); *G10L 15/265* (2013.01); *H04M 1/72519* (2013.01)

(58) Field of Classification Search
CPC ..................... G10L 15/265; H04M 1/72519
USPC .................................. 704/235, 275
See application file for complete search history.

(56) References Cited

U.S. PATENT DOCUMENTS

| | | | |
|---|---|---|---|
| 2003/0009330 A1 | 1/2003 | Cho | |
| 2005/0209858 A1* | 9/2005 | Zak | ............................. 704/275 |
| 2007/0135187 A1* | 6/2007 | Kreiner | ................ H04M 1/271 |
| | | | 455/575.2 |
| 2007/0143679 A1* | 6/2007 | Resner | ......................... 715/706 |
| 2009/0253463 A1 | 10/2009 | Shin et al. | |
| 2009/0254351 A1 | 10/2009 | Shin et al. | |
| 2010/0273529 A1 | 10/2010 | Oh et al. | |
| 2010/0283735 A1 | 11/2010 | Kim et al. | |

(Continued)

FOREIGN PATENT DOCUMENTS

| | | |
|---|---|---|
| KR | 10-2009-0107365 A | 10/2009 |
| KR | 10-2009-0107852 A | 10/2009 |

(Continued)

*Primary Examiner* — Farzad Kazeminezhad
(74) *Attorney, Agent, or Firm* — Birch, Stewart, Kolasch & Birch, LLP

(57) ABSTRACT

A user interface method and corresponding device, where the user interface method includes waiting for detection of an event, which is a function of the user interface device, performing the event detection in the user interface device and notifying a user that the event has been detected, activating a voice input unit configured to allow the user to input his or her voice therethrough, receiving a voice command from the user with respect to the event through the voice input unit, and processing a function according to the received voice command from the user, including repeated output of an audible signal or a visual display or a vibration to notify the user when the command had not been received.

10 Claims, 12 Drawing Sheets

(56) References Cited

U.S. PATENT DOCUMENTS

2011/0105190 A1* 5/2011 Cha et al. .................... 455/566
2011/0313768 A1* 12/2011 Klein et al. .................. 704/251

FOREIGN PATENT DOCUMENTS

KR  10-2010-0120958 A   11/2010
WO  WO 2010/128765 A2  11/2010

\* cited by examiner

Figure 6
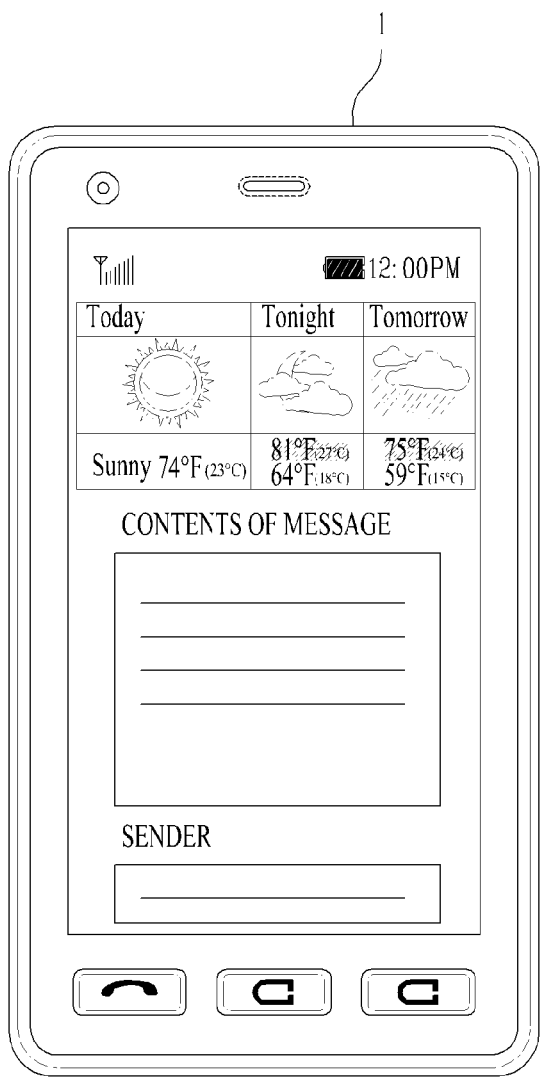

Figure 7
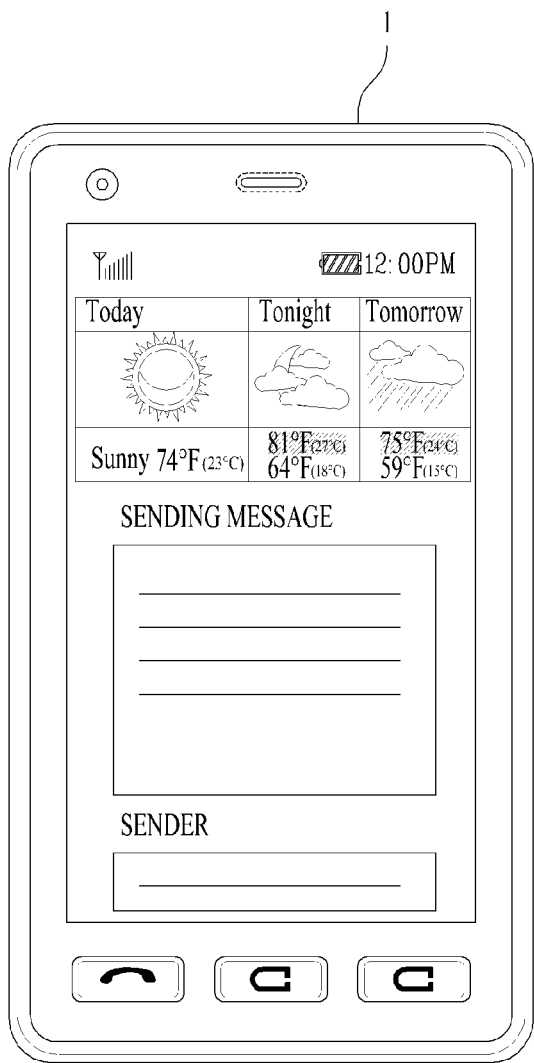
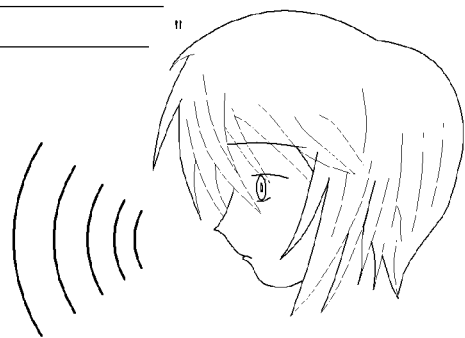

Figure 9

| Event | Event notification | Event processing |
|---|---|---|
| Message receipt | - Notification of message receipt<br>- Notification of kind of message<br>- Notification of sender /phone number | - Output of message contents<br>- Deletion of message<br>- Reply to message/dialing<br>- Spam processing |
| Message receipt | - Notification of phone call receipt<br>- Notification of sender /phone number | - Answering phone<br>- Refusal to answer phone<br>- automatic response |
| Schedule | Notification of schedule time | - Output of schedule contents<br>- Deletion of schedule<br>- Display of schedule processing completion |
| Need/Completion of charge | Notification of Need /Completion of charge | Deletion of notification |
| Switching between 3G and Wifi | Notification of switching between 3G and Wifi | Deletion of notification |
| Out of communication area | Notification of 'out of | Deletion of notification |

USER INTERFACE METHOD AND DEVICE COMPRISING REPEATED OUTPUT OF AN AUDIBLE SIGNAL AND A VISUAL DISPLAY AND VIBRATION FOR USER NOTIFICATION

CROSS REFERENCE TO RELATED APPLICATIONS

This application claims the benefit of Korean Patent Application No. 10-2011-0096721, filed on Sep. 26, 2011, which is hereby incorporated by reference as if fully set forth herein.

BACKGROUND OF THE INVENTION

Field of the Invention

The embodiments of the present invention relate to a user interface method and device, and more particularly, to a user interface method and device that are capable of more easily controlling the user interface device using a multimodal interface.

Discussion of the Related Art

As speech recognition and speech synthesis technologies have been developed in recent years, there has been increasingly a necessity for multimodal interface using a voice and other additional input units in terminals, such as a portable terminal, a home network terminal and a robot.

The term multimodal may be defined as referring to a plurality of modalities. Multimodal channels may be channels converted by a mechanical and/or electrical device through modeling of sensing channels, such as sight, hearing, tactile sensation, taste and the sense of smell, of a human being. Also, synthesizing and exchanging of the respective modalities may be referred to as multimodal interaction.

Meanwhile, speech recognition is a process to map an acoustic speech signal into text using a computer. Specifically, speech recognition is a process to convert an acoustic speech signal obtained by a microphone (e.g., during a telephone conversation) into a set of words or a sentence. Results of the speech recognition may be used in applications, such as a command, a control input or parameter, data input (e.g., document preparation), etc. Also, results of the speech recognition may be used in an application, such as speech comprehension, as an input of a language processing function. Speech recognition technology enables natural or almost natural communication between a human being and a computer.

Speech synthesis is a process to automatically generate a speech waveform using a mechanical and/or electrical device, an electronic circuit or a computer. Text-to-speech (TTS) is a technology to analyze and process data input in a text form and to convert the data into a voice.

A user generally presses a keyboard, a keypad or a touchpad with hands to input a control command, thereby controlling a terminal, such as a cellular phone, a personal computer (PC) and a tablet PC.

For example, when a message is received by a cellular phone, a user presses a touchpad or a keypad of the cellular phone to view text or write a reply. In order to control the terminal in response to an event detected in a terminal, such as receipt of text, a user generally uses an input method using hands.

In this case, however, it may be difficult for the user to control the terminal when one or both hands of the user are not free. For this reason, there has been needed a method and device for controlling a terminal in response to an event detected in the terminal using a voice, not hands, of a user.

That is, there has been needed a method and device for efficiently controlling an event detected in a terminal using speech recognition and speech synthesis.

SUMMARY OF THE INVENTION

Accordingly, embodiments of the present invention are directed to a user interface method and device that substantially obviates one or more problems due to limitations and disadvantages of the related art.

An object of an embodiment of the present invention is to provide a user interface method and device that are capable of more easily controlling an event detected in a terminal using a multimodal interface.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a user interface method includes waiting for detection of an event, which is a function of a user interface device, performing the event detected in the user interface device and notifying a user that the event has been detected, activating a voice input unit configured to allow the user to input his or her voice therethrough, receiving a voice command from the user with respect to the event through the voice input unit, and processing the event according to the received voice command from the user.

Also, the step of waiting for detection of the event may include inactivating the voice input unit.

Also, the step of performing the event detected in the user interface device and notifying the user that the event has been detected may include outputting a voice or a screen to notify the user that the event has been detected.

Also, the user interface method may further include determining whether the received voice command from the user is an end command.

Also, the step of waiting for detection of the event may be performed upon determining that the received voice command from the user is the end command.

Also, the user interface method may further include determining whether the voice command from the user has been input to the voice input unit within a predetermined time.

Also, the step of waiting for detection of the event may be performed upon determining that the voice command from the user has not been input to the voice input unit within the predetermined time.

In another aspect of the present invention, a user interface device includes a voice input unit configured to allow a user to input his or her voice therethrough, an output unit configured to output a screen and a voice, and a controller configured to wait for detection of an event, which is a function of the user interface device, performing the event detection in the user interface device and notify the user that the event has been detected, activate the voice input unit, control the voice input unit to receive a voice command from the user with respect to the event therethrough, and process a function according to the received voice command from the user.

Also, the controller may inactivate the voice input unit at the step of waiting for detection of the event.

Also, the controller may control the output unit to output a voice or a screen so as to notify the user that the event has been detected at the step of performing the event generated in the user interface device and notifying the user that the event has been detected.

Also, the controller may be configured to further determine whether the received voice command from the user is an end command.

Also, the controller may be configured to wait for detection of the event upon determining that the received voice command from the user is the end command.

Also, the controller may be configured to further determine whether the voice command from the user has been input to the voice input unit within a predetermined time.

Also, the controller may be configured to wait for detection of the event upon determining that the voice command from the user has not been input to the voice input unit within the predetermined time.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 6 to 8 are views showing the user interface device according to an embodiment of the present invention which processes an event according to the received voice command;

FIG. 9 is a view showing kinds of events, event notifications and event processes of the user interface device according to an embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Wherever possible, terminologies used in the following description of the present invention are selected from general terminologies that are widely used at present. However, this applicant selects the terminologies voluntarily as required. In this case, since meanings of the voluntary terminologies will be described in the following description of the present invention in detail, it is noted that the present invention must not be understood by names of the terminologies, but by the meanings of the terminologies.

In the following description, a suffix "module" or "unit" contained in terms of constituent elements to be described will be selected or used together in consideration only of the convenience of writing the following specification, and the suffixes "module" and "unit" do not necessarily have different meanings or roles.

A user interface device, described in the specification, is a terminal in which a user interface method, which will be described below, is performed. The user interface device may include cellular phones, smart phones, personal digital assistants (PDAs), portable multimedia players (PMPs), personal computers (PCs), tablet PCs, and all other terminals that can be used by users. In the specification, a smart phone will be described as an example of the user interface device.

Figure 1:
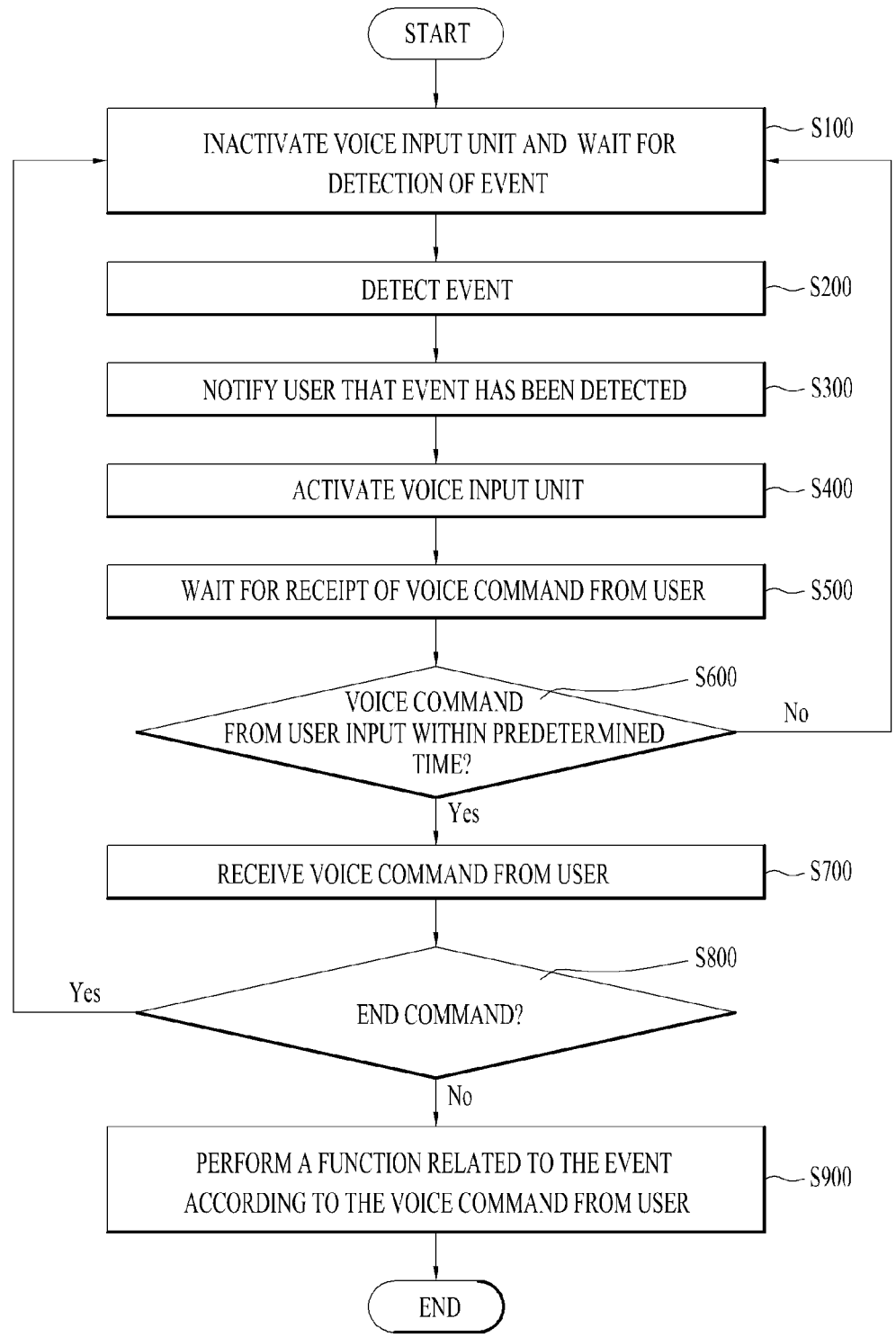
FIG. 1 is a flow chart showing a user interface method according to an embodiment of the present invention.

FIG. 1 is a flow chart showing a user interface method according to an embodiment of the present invention.

As shown in FIG. 1, the user interface method according to an embodiment of the present invention includes inactivating a voice input unit of a terminal and waiting for detection of an event (S100), detecting an event in the terminal (S200), notifying a user that the event has been detected (S300), activating the voice input unit of the terminal (S400), waiting for receipt of a voice command from the user (S500), determining whether the voice command from the user has been input to the voice input unit within a predetermined time (S600), receiving the voice command from the user (S700), determining whether the voice command from the user is an end command (S800), and processing the detected event according to the voice command from the user (S900).

Hereinafter, the respective steps will be described in detail. First, the user interface device of an embodiment of the present invention inactivates the voice input unit, which is configured to allow a user to input his or her voice therethrough. The voice input unit of an embodiment of the present invention may include a microphone mounted inside or outside the user interface device to allow a user to input his or her voice therethrough. The user interface device waits for detection of an event in a state in which the voice input unit is inactivated (S100). That is, the terminal stops the function of the microphone and enters a standby mode in which an input operation is not performed by a user or an event is not detected.

Subsequently, an event is detected in the user interface device (S200). In an embodiment of the present invention, the event is a function of the terminal which needs notification to a user or user input. For example, the event may include message receipt, phone call receipt and schedule notification. Consequently, that an event is detected in the user interface device means that a message is received by the terminal, a phone call is received by the terminal, and schedule input in the terminal is notified to a user. In an embodiment of the present invention, events detected in the user interface device are efficiently controlled and processed. The above-mentioned event will be described below in detail.

Subsequently, the user interface device notifies a user that the event has been detected (S300). The user interface device transmits a notification message corresponding to the detected event to the user. For example, the user interface device may generate vibration, output a voice message or output a screen message to notify the user that the event has been detected.

For example, in a case in which a message is received by the user interface device as an event, the user interface device may output a screen notifying receipt of the message to the user or may output a voice notifying receipt of the message to the user. At this time, the user interface device controls a voice output unit, such as a speaker, or a screen output unit, such as a display device, to output a message of event detection to the user.

Subsequently, the user interface device activates the voice input unit (S400). The voice input unit is activated to allow a user to input his or her voice with respect to the event detected in the user interface device. As previously described, the voice input unit, such as the microphone, mounted at the user interface device is turned on.

Subsequently, the user interface device waits for receipt of a voice command from the user (S500). After activating the voice input unit, the user interface device waits for user inputting a voice command through the voice input unit.

The user interface device determines whether the voice command from the user has been input through the voice input unit within a predetermined time (S600). Upon determining that the voice command from the user has not been input through the voice input unit within the predetermined time, the user interface device inactivates the voice input unit and waits for detection of an event (S100). When the user has not recognized the event notification message or does not want to process or control the event, the user interface device enters a standby mode without processing the detected event.

On the other hand, upon determining that the voice command from the user has been input through the voice input unit within the predetermined time, the user interface device receives the voice command from the user (S700). The user inputs a voice command necessary to process the detected event to the user interface device through the voice input unit. The user interface device receives the voice from the user and recognizes and interprets the received voice command from the user. This processing is carried out through a speech recognition module and a speech interpretation module 12, which will be described below with reference to FIG. 11.

In summary, in an embodiment of the present invention, steps S500-S700 may be considered as a timer function that initiates upon activation of the voice input unit. If the voice command of step S700 is received before the timer of step S600 expires, the process proceeds to steps S800. If the voice command of step S700 is not received before the timer of step S600 expires, the process returns to step S100.

In an embodiment of the present invention, the voice command of step S700 is a voice containing user intention of processing the detected event. An example of the voice command from the user may include a voice from a user who wants to know the contents of a message when the message has been received by the user interface device or a voice from a user who wants to know the name of a sender of a phone call when the phone call has been received by the user interface device. The user interface device of an embodiment of the present invention processes the detected event according to the voice command from the user.

In an embodiment of the present invention, the voice command from the user may be composed of a voice prescribed between the user and the user interface device. That is, predetermined voice data, such as 'dialing', 'contents of received message', and 'schedule contents', are stored in the user interface device, and, when a corresponding voice is input from the user, the user interface device processes an event corresponding thereto.

The user interface device determines whether the voice command from the user is an end command (S800). The end command may include 'end' or 'close'. When the user inputs the end command through the voice input unit, the user interface device inactivates the voice input unit and waits for detection of an event (S100). When the user does not want to process or control the event, the user interface device enters a standby mode without processing the detected event.

Finally, the user interface device processes the detected event according to the voice command from the user (S900). The event processing of the user interface device may be based on a function realized in the user interface device. For example, when an event of message receipt is detected in the user interface device, and the user inputs a voice command to request the contents of the message through the voice input unit, the user interface device outputs the contents of the message through a voice or a screen according to the voice command from the user.

In the user interface method according to an embodiment of the present invention as described above, it is possible for the user to control the event detected in the user interface device through his or her voice even in a state in which the user is distant from the user interface device or it is not possible for the user to control the user interface device with hands. Also, it is possible to efficiently notify the event detected in the user interface device to the user through a voice.

Hereinafter, the respective steps of the user interface method will be described in detail with reference to the drawings. In the specification, a smart phone will be described as an example of the user interface device.

Figure 2:
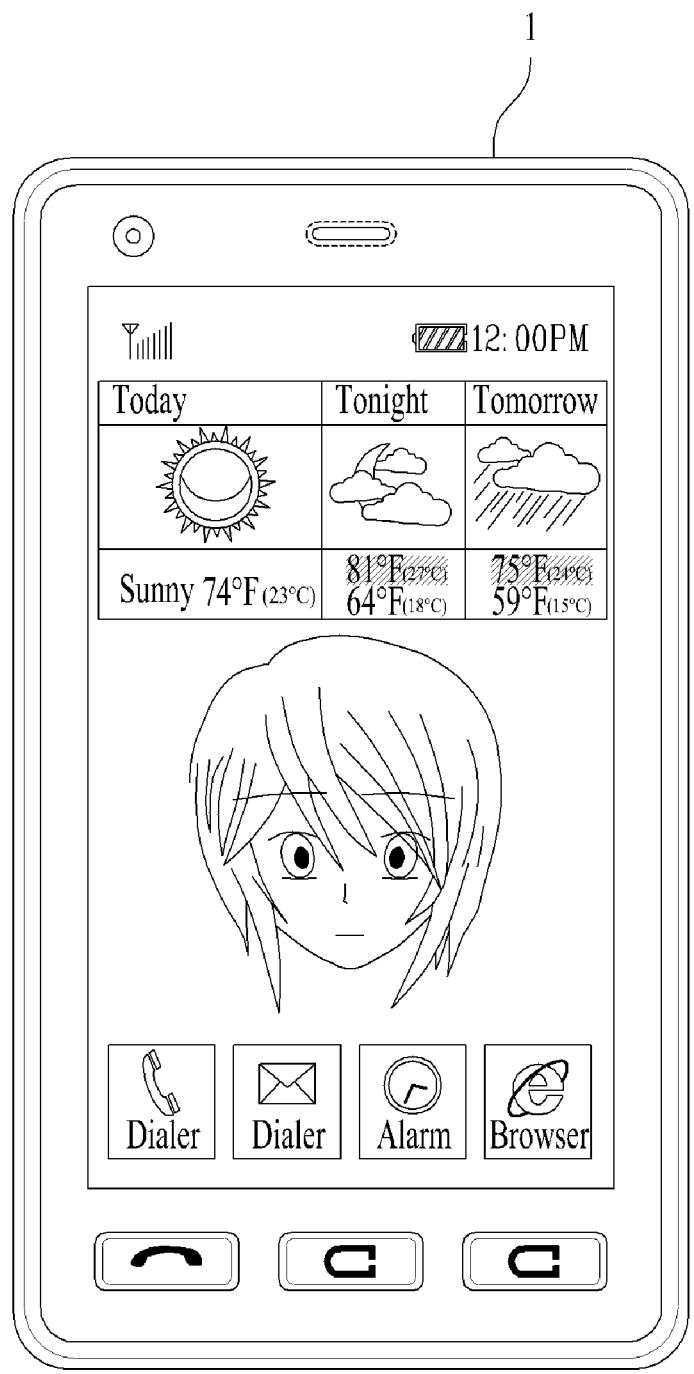
FIG. 2 is a view showing a user interface device according to an embodiment of the present invention which is in a standby mode.

FIG. 2 is a view showing a user interface device 1 according to an embodiment of the present invention which is in a standby mode.

The user interface device 1 may be configured to perform routine functions of a terminal. In the drawing, there is shown a user interface device 1 configured to perform routine functions of a terminal. That is, the user interface device 1 may be configured to perform routine functions of a smart phone, such as receiving and sending of phone calls/messages, execution of applications, and system setting, and the user interface device 1 may include various components necessary to perform the above functions.

When the user interface device 1 is in a standby mode, the voice input unit is inactivated. As previously described, the voice input unit of an embodiment of the present invention may include a microphone mounted inside or outside the user interface device 1 to allow a user to input his or her voice therethrough. The user interface device 1 waits for detection of an event in a state in which the voice input unit is inactivated.

The user interface device 1 stops the function of the microphone and enters a standby mode in which an input operation is not performed by a user or an event is not detected. That is, general functions of the user interface device 1 are performed in a state in which the voice input unit is off. The voice input unit of the user interface device 1 may be activated in the standby mode. Preferably, however, the voice input unit of the user interface device 1 is inactivated in the standby mode in consideration of power consumption.

Figure 3:
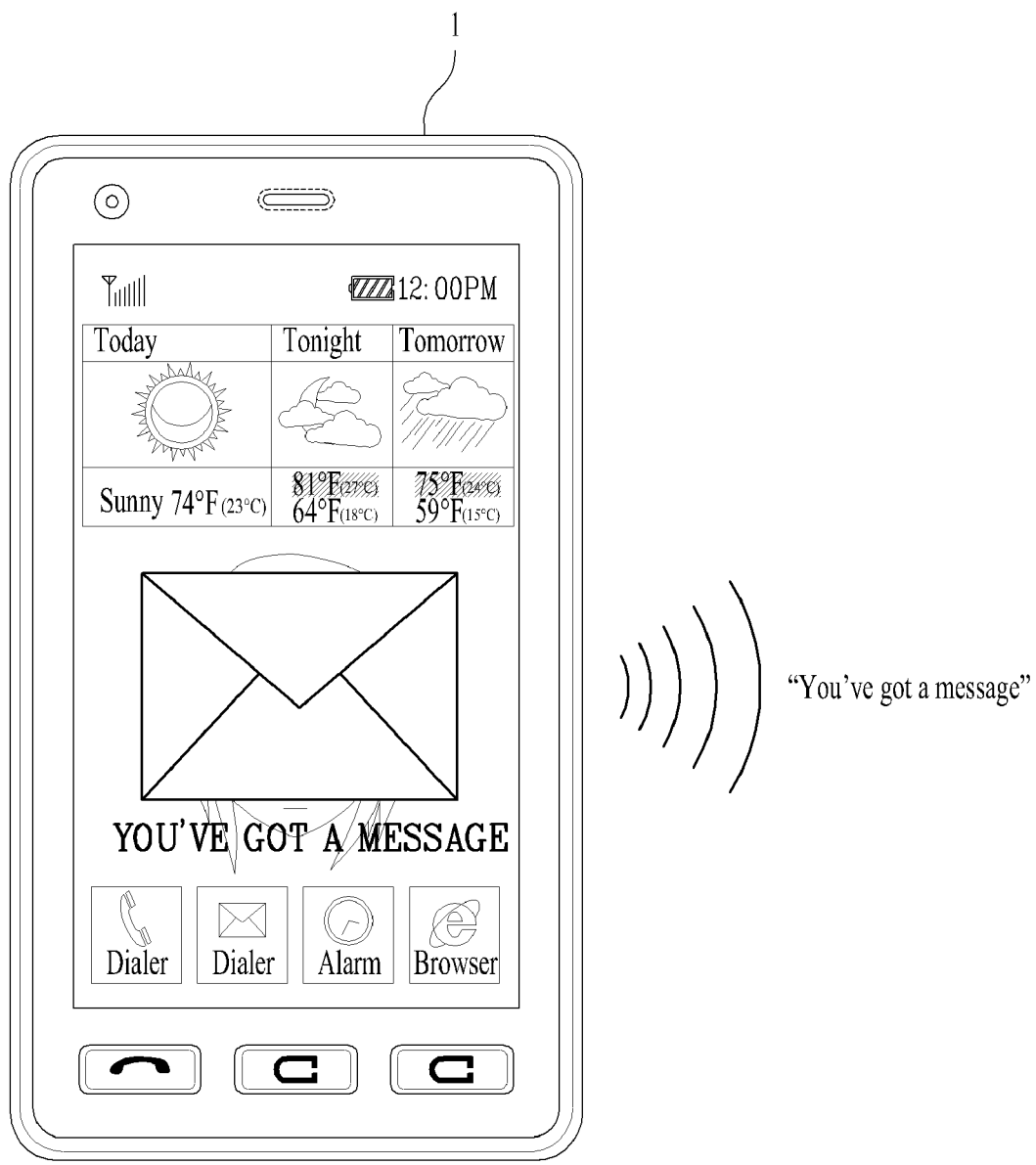
FIG. 3 is a view showing the user interface device according to an embodiment of the present invention which notifies detection of an event.

FIG. 3 is a view showing the user interface device according to an embodiment of the present invention which notifies detection of an event.

In the specification, the user interface method of an embodiment of the present invention will be described with an example in which an event of message receipt is detected in the user interface device 1, as shown in the drawing.

As previously described, the event of an embodiment of the present invention is a function of the user interface device 1 which needs notification to a user or user input. For example, the event may include message receipt, phone call receipt and schedule notification. Consequently, that an event is detected in the user interface device 1 means that a message is received by the user interface device 1, a phone call is received by the user interface device 1, and schedule input in the user interface device 1 is notified to a user. In an embodiment of the present invention, events detected in the user interface device 1 are efficiently controlled and processed.

When a message receipt event is detected in the user interface device 1, the user interface device 1 notifies a user that the event has been detected. The user interface device 1 transmits a notification message corresponding to the detected event to the user. As shown in the drawing, the user interface device 1 may output an audible message of "You've got a message" and/or output an image of message receipt on a screen to notify the user that the event has been detected. Also, the user interface device 1 may detect vibration or adjust the brightness of the screen to notify the user that the event has been detected.

In this case, the user interface device 1 controls a voice output unit, such as a speaker, a screen output unit, such as a display device, or a vibration device to output a message of event detection to the user.

Figure 4:
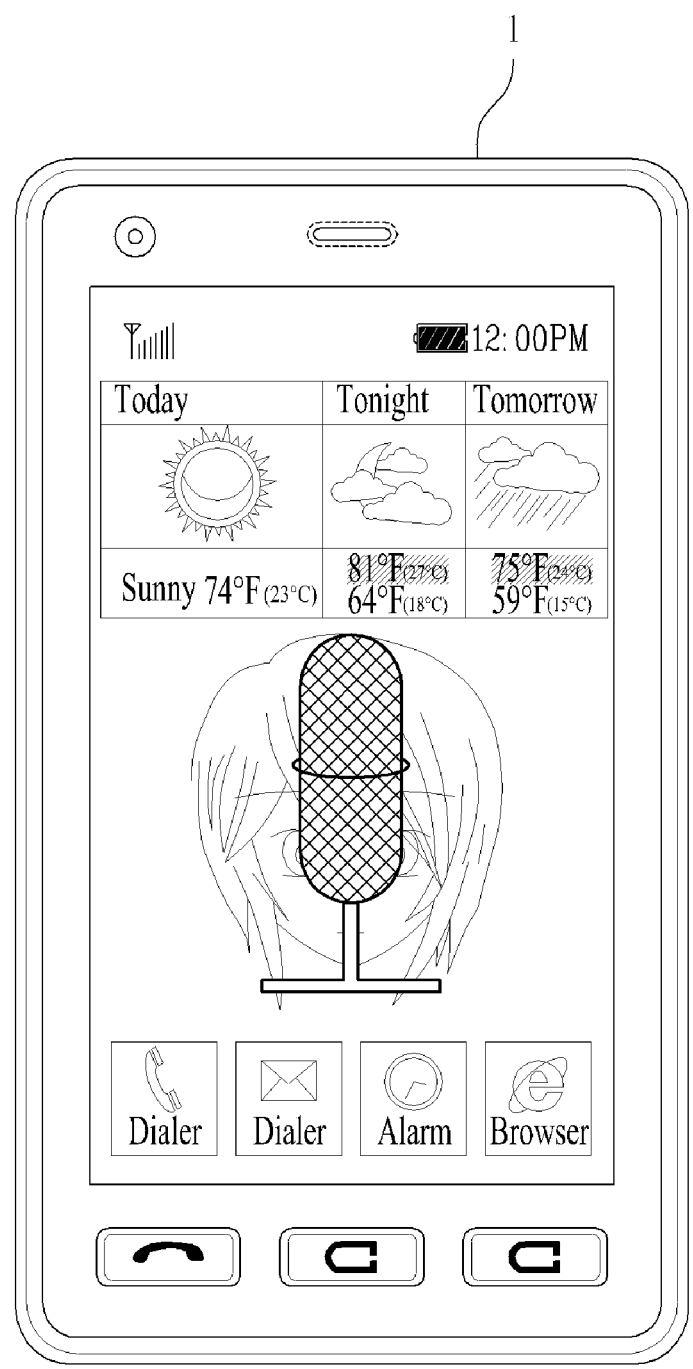
FIG. 4 is a view showing the user interface device according to an embodiment of the present invention which waits for receipt of a voice command.

FIG. 4 is a view showing the user interface device 1 according to an embodiment of the present invention which waits for receipt of a voice command.

The user interface device 1 actives the voice input unit, after outputting the message notifying the event detection to the user, to allow the user to input a voice command with respect to the event detected in the user interface device 1. As previously described, the voice input unit, such as the microphone, mounted at the user interface device 1 is turned on.

After the voice input unit is turned on, the user interface device 1 may display that the voice input unit has been activated on the screen of the user interface device 1, as shown in the drawing. In the drawing, for example, a microphone image is output to the screen of the user interface device 1. Alternatively or additionally, a voice message indicating that the voice input unit has been activated may be output to notify the user that the voice input unit has been activated.

After the voice input unit is turned on, the user interface device 1 waits for receipt of a voice command from the user.

The user interface device 1 determines whether the voice command from the user has been input through the voice input unit within a predetermined time. Upon determining that the voice command from the user has not been input through the voice input unit within the predetermined time, the user interface device 1 inactivates the voice input unit and waits for detection of another event. Thus, when the user does not want to or is unable to process or control the event, the user interface device 1 enters a standby mode without processing the detected event.

In addition, upon determining that the voice command from the user has not been input through the voice input unit within the predetermined time, the user interface device 1 may repeatedly notify that the event has been detected, which is provided for a case in which the user has not recognized the event notification message.

Figure 5:
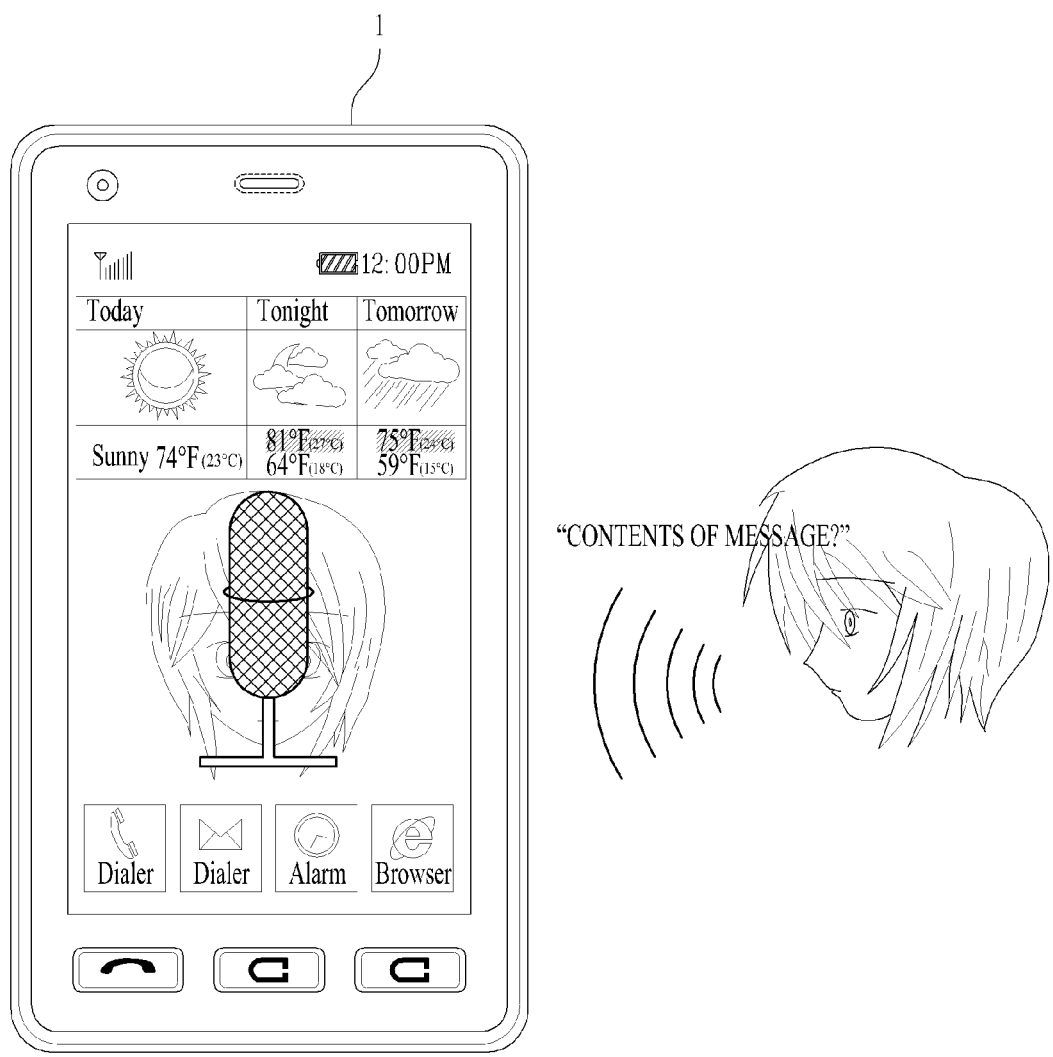
FIG. 5 is a view showing the user interface device according to an embodiment of the present invention which receives a voice command.

FIG. 5 is a view showing the user interface device 1 according to an embodiment of the present invention which receives a voice command.

When the voice command from the user is input through the voice input unit within the predetermined time, as shown in the drawing, the user interface device 1 receives the voice command from the user.

The user inputs a voice command necessary to process the detected event to the user interface device 1 through the voice input unit. The user interface device 1 receives the voice command from the user and recognizes and interprets the received voice command from the user. The user interface device 1 processes the detected event according to the recognized and interpreted voice command from the user.

As previously described, the voice command from the user is a voice containing user intention of processing the detected event. An example of the voice command from the user may include a voice from a user who wants to know the contents of a message when the message has been received by the user interface device 1 or a voice from a user who wants to know the name of a sender of a phone call when the phone call has been received by the user interface device 1.

Also, the voice command from the user may be composed of a voice prescribed between the user and the user interface device. That is, predetermined voice data, such as 'dialing', 'contents of received message', 'schedule contents', 'end' and 'close', are stored in the user interface device 1, and, when a corresponding voice is input from the user, the user interface device 1 processes an event corresponding thereto.

In the drawing, for example, the user inputs a voice of "contents of message?" meaning that the user wants to know the contents of the message through the voice input unit. The user interface device 1 recognizes and interprets the voice as a command to request the contents of the received message.

Also, the user interface device 1 determines whether the received voice command from the user is an end command such as 'end' or 'close'. When the user inputs the end command through the voice input unit, the user interface device 1 inactivates the voice input unit and waits for detection of another event. When the user does not want to process or control the event, the user interface device 1 enters a standby mode without processing the detected event.

The voice commands that are recognized may be pre-set by the manufacturer and/or may be set by the user via a voice command set-up screen. Also, previously set voice commands may be re-set to allow new or multiple voices to be recognized by the user interface device 1.

Figure 8:
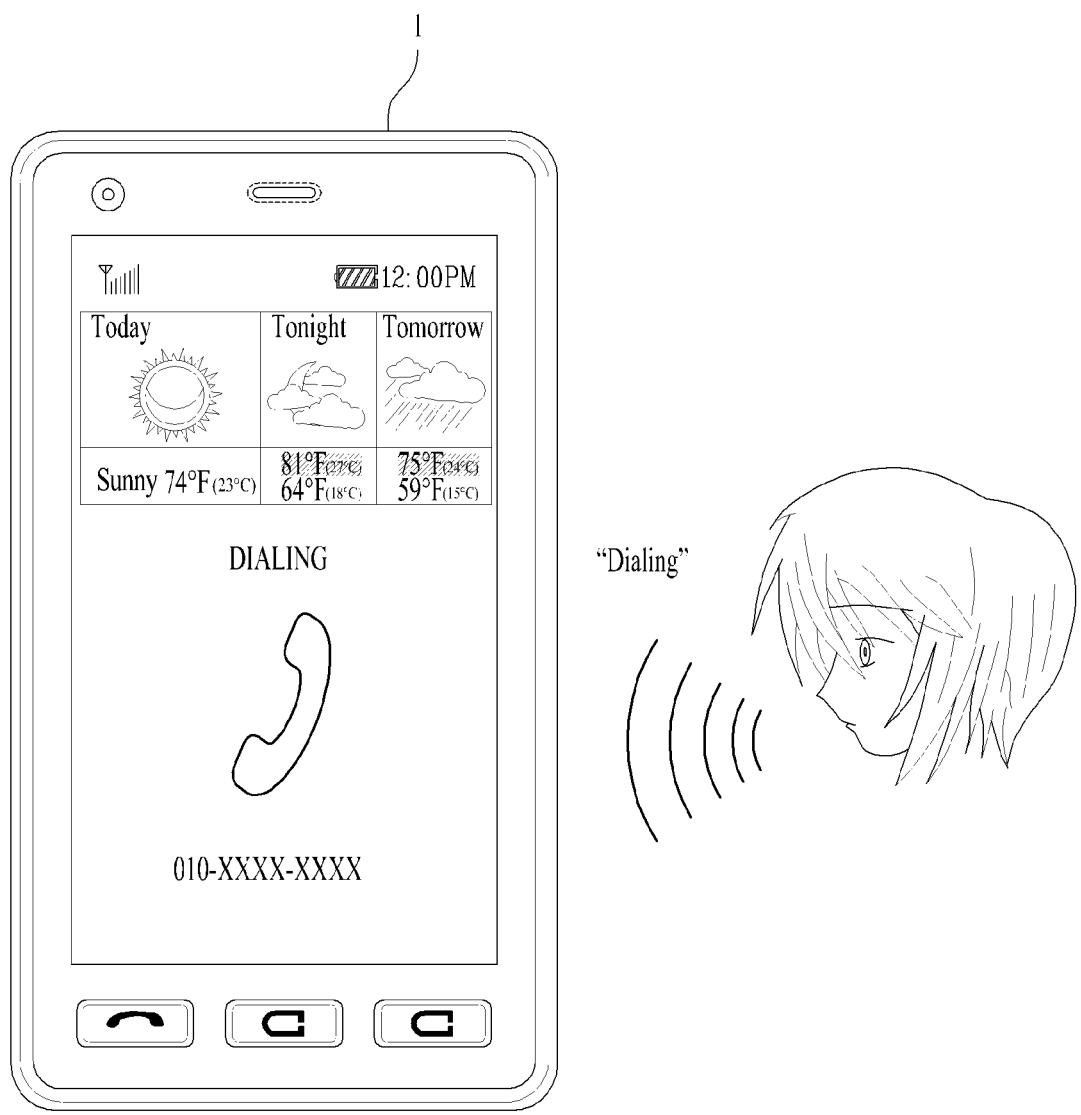

FIGS. 6 to 8 are views showing the user interface device 1 according to an embodiment of the present invention which processes an event according to the received voice command.

The user interface device 1 processes the detected event according to the voice command from the user. The event processing of the user interface device 1 may be based on a function realized in the user interface device 1, which will hereinafter be described with reference to the drawings.

FIG. 6 shows an embodiment in which, when an event of message receipt is detected in the user interface device 1, as shown in FIG. 3, the user interface device 1 processes the event of message receipt according to the voice command from the user. When the user inputs a voice command to request the contents of the message through the voice input unit, as shown in FIG. 5, the user interface device 1 outputs the contents of the message through an audible output and/or through a screen according to the voice command from the user.

FIG. 7 shows another embodiment in which, when an event of message receipt is detected in the user interface device 1, as shown in FIG. 3, the user interface device 1 processes the event of message receipt according to the voice command from the user. When the user inputs a voice command to request that a reply be sent to the sender of the message through the voice input unit, the user interface device 1 sends the reply to the sender of the message according to the voice command from the user.

At this time, as shown in the drawing, the user may input the contents of the reply to the user interface device 1 using his or her voice. When the user inputs the contents of the reply to the user interface device 1 through the voice input unit using his or her voice, the user interface device 1 recognizes and interprets the contents of the reply and makes and sends a reply message. The contents of the reply may or may not be displayed on the screen. Also, the user interface device 1 may or may not be configured to process a second voice command directing the device to play back the reply before it is sent.

FIG. 8 shows a further embodiment in which, when an event of message receipt is detected in the user interface device 1, as shown in FIG. 3, the user interface device 1 processes the event of message receipt according to the voice command from the user. When the user inputs a voice command for dialing through the voice input unit, the user interface device 1 makes a phone call to the sender of the message according to the voice command from the user. The user interface device may output audible information to indicate that the command is being executed (e.g., that the device is dialing) and/or display information indicating that the command is being executed (e.g., that the device is dialing).

The user interface device 1 supports various event processing functions according to the detected event. This is based on functions realized in the user interface device 1. As previously described, the user interface device 1 may provide event processing functions, such as output of message contents, making and sending of a reply to the message, and dialing to the sender, with respect to the event of message receipt. With respect to the event detected in the user interface device 1, the user inputs a voice command corresponding to an event process desired by the user through the voice input unit, and the user interface device 1 performs the corresponding event process. The user interface device 1 may or may not display information about the executed command. Such displays may replace all or some of a previously displayed screen, or may cause all or part of a previously displayed screen to be re-arranged or otherwise modified.

FIG. 9 is a view showing kinds of events, event notifications and event processes of the user interface device 1 according to an embodiment of the present invention.

As shown in the drawing, the user interface device 1 provides various event notifying and processing functions with respect to the event detected in the user interface device 1.

First, when an event of message receipt is detected in the user interface device 1, the user interface device 1 may notify the user of message receipt, the kind of the message, the sender, etc. Also, the user interface device 1 may provide event processing functions, such as output of the message contents, deletion of the message, reply to the message, and dialing, according to the voice command from the user input through the voice input unit.

On the other hand, when an event of phone call receipt is detected in the user interface device 1, the user interface device 1 may notify the user of phone call receipt, the sender, etc. Also, the user interface device 1 may provide event processing functions, such as answering the phone call, refusal to answer the phone call, and automatic response, according to the voice command from the user input through the voice input unit.

In addition, when an event of schedule notification is detected in the user interface device 1, the user interface device 1 may notify the user of schedule notification, etc. at a predetermined time. Also, the user interface device 1 may provide event processing functions, such as output of schedule contents, deletion of the schedule, and display of schedule processing completion, according to the voice command from the user input through the voice input unit.

In addition, when events of need/completion of charge, switching between 3G and Wifi, out of communication area, etc. are detected in the user interface device 1, the user interface device 1 may notify the user of need/completion of charge, switching between 3G and Wifi, out of communication area, etc. Also, the user interface device 1 may provide an event processing function, such as deletion of notification, according to the voice command from the user input through the voice input unit. In addition, the user interface device 1 may output only the notification of the corresponding event to the user. That is, it is possible to perform only the notification of the event without providing the event processing function.

It is obvious that the event notification and processing functions provided by the user interface device 1 are not limited by the examples shown in FIG. 9.

Figure 10:
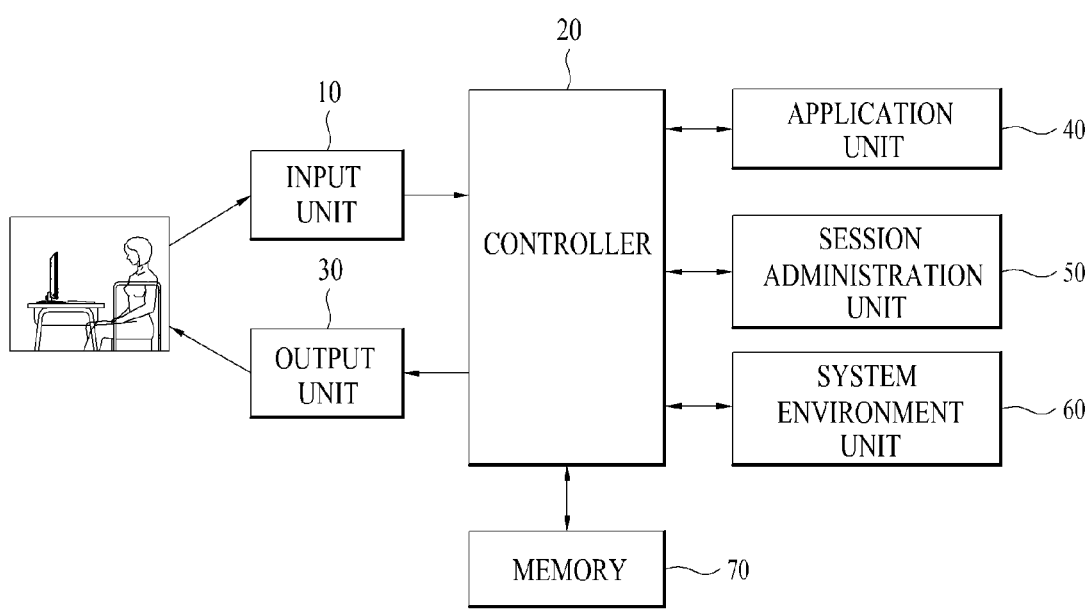
FIG. 10 is a block diagram of the user interface device according to an embodiment of the present invention.

FIG. 10 is a block diagram of the user interface device 1 according to an embodiment of the present invention.

As shown in FIG. 10, the user interface device 1 according to an embodiment of the present invention includes an input unit 10, a controller 20, an output unit 30, an application unit 40, a session administration unit 50, a system environment unit 60 and a memory 70.

The input unit 10 may be configured to provide various input modes, such as audio, voice, touch gesture, gesture, keyboard and mouse. The output unit 30 may be configured to provide various output modes, such as voice, text, graph, haptic and audio outputs.

However, embodiments of the present invention are not limited to the above-defined input and output modes. Additional input or output modes may be added, or the above input and output modes may be omitted. The details of the input unit 10 and the output unit 30 are described below with reference to FIGS. 11 and 12, respectively.

The controller 20 executes an application service using information obtained from the input unit 10 and provides results thereof to the output unit 30. The session administration unit 50 performs session administration between various terminals and a multimodal application service and a synchronizing function for output from the terminals. The system environment unit 60 provides information regarding change of a terminal and user environment to the controller 20, which recognizes and copes with the information.

Figure 11:
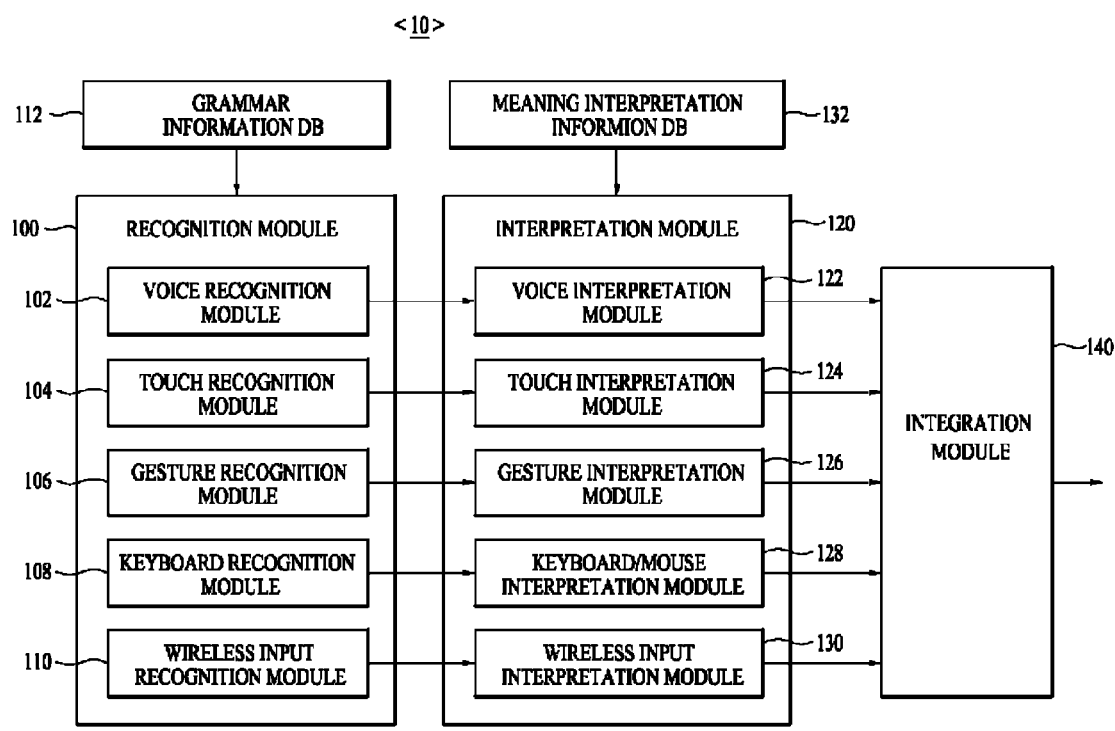
FIG. 11 is a block diagram showing an input unit of FIG. 10 in more detail.

FIG. 11 is a block diagram showing the input unit 10 of FIG. 10 in more detail.

As shown in FIG. 11, the input unit 10 includes a recognition module 100, an interpretation module 120, and an input integration module 140.

The recognition module 100 is configured in the form of information, by which it is possible to easily recognize and interpret input from a user using a multimodal interface, using grammar information stored in a grammar information database (DB) 112. More specifically, the recognition module 100 may include a speech recognition module 102, a touch recognition module 104, a gesture recognition module 106, a keyboard recognition module 108 and a wireless input recognition module 110.

The speech recognition module 102 converts speech of a user into text. At this time, the speech recognition module 102 may convert speech of the user into text using an acoustic model, a language model and World Wide Web Consortium (W3C) speech recognition grammar stored in the grammar information DB 112 or a grammar such as a stochastic language model standard.

Also, the speech recognition module 102 may speech-recognize the aforementioned voice commands from the user. A text error correction command or a correction mode shift command may be speech-recognized.

The touch recognition module 104 detects and outputs a touch gesture of a user on a touch screen.

The gesture recognition module 106 detects and outputs a gesture input of a user using a camera.

The keyboard recognition module 108 converts and outputs keys input by a user into text.

The wireless input recognition module 110 recognizes and outputs input from a user through a wireless remote control.

The interpretation module 120 information recognized by the recognition module 100 as a meaning intended by a user according to meaning interpretation information stored in a meaning interpretation information DB 132. For example, the interpretation module 120 converts 'yes', 'yea' or 'yeah' into 'yes'. Output data of the interpretation module 120 may be converted into an extended multimodal annotation language (EMMA), which is one of the languages indicating meanings of data, and then input to the integration module 140.

The interpretation module 120 may include a speech interpretation module 122, a touch interpretation module 124, a gesture interpretation module 126, a keyboard interpretation module 128 and a wireless input interpretation module 130, which correspond to the speech recognition module 102, the touch recognition module 104, the gesture recognition module 106, the keyboard recognition module 108 and the wireless input recognition module 110 included in the recognition module 100, respectively.

The integration module 140 integrates and transmits various kinds of inputs output from the interpretation module 120 to the controller 20.

The recognition module 100, the interpretation module 120 and the integration module 140 may be separated or integrated. In particular, the integration module 140 may be configured to be a part of the controller 20 as needed.

Hereinafter, the output unit 30 will be described in detail with reference to FIG. 12.

Figure 12:
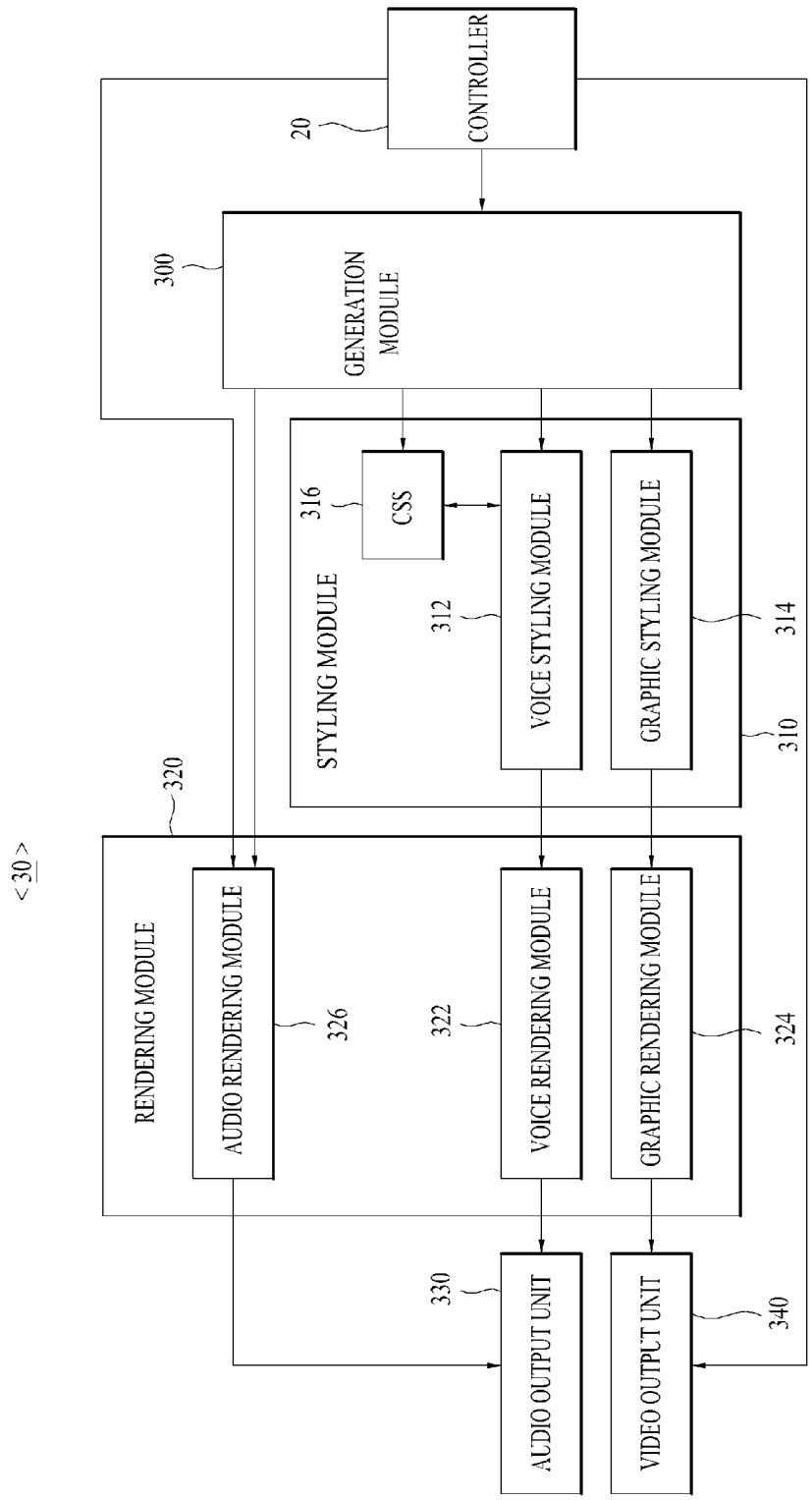
FIG. 12 is a block diagram showing an output unit of FIG. 10 in more detail.

FIG. 12 is a block diagram showing the output unit 30 of FIG. 10 in more detail.

As shown in FIG. 12, the output unit 30 includes a generation module 300, a styling module 310, a rendering module 320, an audio output unit 330, and a video output unit 340.

When information to be transmitted to a user is input from the controller 20, the generation module 300 decides an output mode, such as voice or graph, in which the information is output. The generation module 300 may determine that only one output mode in which the information is output or that a plurality of output modes in which the information is output supplementarily or complementarily. In another embodiment, the generation module 300 may be integrated into the controller 20.

The styling module 310 serves to add information regarding how the information is expressed. The styling module 310 may include a voice styling module 312 and a graphic styling module 314.

The voice styling module 312 may configure a text string including a speech synthesis markup language (SSML) tag indicating how a word is pronounced. Also, the voice styling module 312 may add information regarding intervals between words of text to be speech-synthesized. At this time, the voice styling module 312 may correct voice output using a cascading style sheets (CSS) 316.

The graphic styling module 314 generates and outputs information regarding how a graph is positioned on a screen 10. For example, the graphic styling module 314 may generate such information using an extensible hyper text markup language (XHTML), XHTML basic, a scalable vector graphics markup tag, etc.

The rendering module 320 converts and outputs the information generated by the styling module 310 into a format in which the information can be easily understood by a user. The rendering module 320 includes a voice rendering module 322 to speech-synthesize and output the text string output from the voice styling module 312, a graphic rendering module 324 to convert and output the information output from the graphic styling module 314 into a graph which is provided to a user, and an audio rendering module 326 to process and output audio data for user interface. The audio data may be directly output from controller 20 to the audio rendering module 326 without being processed by the generation module 300.

The audio output unit 330 outputs the audio data generated by the voice rendering module 322 and the audio rendering module 326 to a user.

The video output unit 340 outputs the graph processed by the graphic rendering module 324 and/or the video data processed by the controller 20 to a user. As previously described, the video output unit 340 may include a touch screen.

Hereinafter, the operation of the user interface device 1 according to an embodiment of the present invention will be described in detail.

First, the controller 20 inactivates the voice input unit 10, which is configured to allow a user to input his or her voice therethrough. The controller 20 waits for detection of an event in a state in which the voice input unit is inactivated. That is, the controller 20 stops the function of the microphone of the user interface device 1 and controls the user interface device to enter a standby mode in which an input operation is not performed by a user or an event is not detected.

When an event is detected in the user interface device 1, the controller 20 notifies a user that the event has been detected. The controller 20 transmits a notification message corresponding to the detected event to the user. For example, the controller 20 may vibrate the user interface device 1, control the audio output unit 330 so that a voice message can be output through the audio output unit 330, or control the video output unit 340 so that a screen message can be output through the audio output unit 330, to notify the user that the event has been detected.

Subsequently, the controller 20 activates the voice input unit 10. The voice input unit 10 is activated to allow the user to input his or her voice with respect to the event detected in the user interface device 1. As previously described, the controller 20 turns on the voice input unit, such as the microphone, mounted at the user interface device 1.

Subsequently, the controller 20 waits for receipt of a voice command from the user. After activating the voice input unit 10, the controller 20 waits for user inputting a voice command through the voice input unit 10.

Subsequently, the controller 20 determines whether the voice command from the user has been input through the voice input unit 10 within a predetermined time. Upon determining that the voice command from the user has not been input through the voice input unit 10 within the predetermined time, the controller 20 inactivates the voice input unit 10 and waits for detection of an event. When the user has not recognized the event notification message or does not want to process or control the event, the controller 20 controls the user interface device to enter a standby mode without processing the detected event.

On the other hand, upon determining that the voice command from the user has been input through the voice input unit 10 within the predetermined time, the controller 20 receives the voice command from the user. The user inputs a voice command necessary to process the detected event to the user interface device 1 through the voice input unit 10. The controller 20 controls the speech recognition module 102 and the speech interpretation module 122 to recognize and interpret the received voice command from the user.

Subsequently, the controller 20 determines whether the received voice command from the user is an end command. When the user inputs the end command through the voice input unit 10, the controller 20 inactivates the voice input unit 10 and waits for detection of an event. When the user does not want to process or control the event, the controller 20 controls the user interface device 1 to enter a standby mode without processing the detected event.

Finally, the controller 20 processes the detected event according to the voice command from the user. The controller 20 process the event based on a function realized in the user interface device 1, which was previously described with reference to FIG. 9.

In the user interface method and device according to the embodiments of the present invention as described above, it is possible for a user to control an event detected in a terminal using his or her voice through an easy and intuitive interface even in a state in which the user is distant from the terminal or it is not possible for the user to control the terminal with hands. Also, it is possible to efficiently notify the event detected in the terminal to the user through a voice.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A user interface method performed by a mobile communication device, the method comprising:
    displaying, by the mobile communication device, a standby screen on a display unit;
    maintaining a voice input unit in an inactive state;
    receiving, by the mobile communication device, a message and displaying, by the mobile communication device, a message reception indicator;
    in response to the reception of the message, activating, by the mobile communication device, the voice input unit from the inactive state, the voice input unit configured to allow the user to input voice commands therethrough;
    replacing, by the mobile communication device, the message reception indicator with a voice input activation indicator to indicate that the voice input unit has been activated;
    receiving, by the mobile communication device, a first voice command from the user through the voice input unit, the first voice command being one of a plurality of voice commands stored in a memory;
    in response to the reception of the first voice command, establishing, by the mobile communication device, a phone call to a sender of the received message;
    receiving, via the mobile communication device, a second voice command from the user through the voice input unit, wherein the second voice command is an end command;
    and in response to the reception of the end command, returning, by the mobile communication device, the voice input unit to the inactive state;
    the method further comprising:
    determining, by the mobile communication device, whether or not the first voice command received from the user has been input to the voice input unit within a predetermined time;
    if the voice command is determined not to have been input within the predetermined time, repeatedly outputting an audible signal or a visual display or a vibration to notify the user that the message has been received.

2. The user interface method according to claim 1, further comprising:
    in response to the reception of the message, outputting an audible signal or a vibration to notify the user that the message has been received.

3. The user interface method according to claim 1, wherein the step of activating the voice input unit further comprises:
    outputting an audible signal or a vibration to notify the user that the voice input unit has been activated.

4. The user interface method according to claim 1, further comprising: if the first voice command is determined not to have been input within the predetermined time, inactivating the previously activated voice input unit and waiting for another event detection.

5. The user interface method according to claim 1, wherein the first or second voice command is composed of a voice stored in the mobile communication device.

6. A user interface device, comprising:
    a voice input unit;
    an output unit configured to output one of one or more visual displays and audible signals and vibrations, the output unit including a display unit; and
    a controller operatively connected to the voice input unit and the output unit, the controller configured to:
    display a standby screen on the display unit,
    maintain a voice input unit in an inactive state,
    receive a message and display a message reception indicator, in response to the reception of the message, activate the voice input unit from the inactive state to allow the user to input voice commands therethrough, replace message reception indicator with a voice input activation indicator to indicate that the voice input unit has been activated, receive a first voice command from the user through the voice input unit, the first voice command being one of a plurality of voice commands stored in a memory, in response to the reception of the first voice command, establish a phone call to a sender of the received message, receive a second voice command from the user through the voice input unit, wherein the second voice command is an end command, and in response to the reception of the end command, return the voice input unit to the inactive state;

wherein the controller is further configured to determine whether or not the first voice command received from the user has been input to the voice input unit within a predetermined time;

wherein, if the voice command is determined not to have been input within the predetermined time, the controller is configured to repeatedly output an audible signal or a visual display or a vibration to notify the user that the message has been received.

7. The user interface device according to claim 6, wherein the controller is configured to, in response to the reception of the message, control the output unit to output an audible signal or a vibration to notify the user that the message has been received.

8. The user interface device according to claim 6, wherein the controller is configured to control the output unit to further output an audible signal or a vibration to notify the user that the voice input unit has been activated.

9. The user interface device according to claim 6, wherein, if the first voice command is determined not to have been input within the predetermined time, the controller is configured to inactivate the previously activated voice input unit and wait for another event detection.

10. The user interface device according to claim 6, wherein the first or second voice command is composed of a voice stored in the user interface device.

* * * * *